United States Patent
Kumacheva et al.

(10) Patent No.: US 6,974,618 B2
(45) Date of Patent: Dec. 13, 2005

(54) MULTICOLORED POLYMER NANOCOMPOSITES FOR OPTICAL MEMORY STORAGE AND SECURITY DATA ENCRYPTION

(75) Inventors: Eugenia Kumacheva, 382 Ellerslie Ave., Toronto (CA), M2R 1B9; Hung H. Pham, 40495 Chapelway, #25, Fremont, CA (US) 94538; Ilya Gourevich, 143 Arlington Ave., Apt. 19, Toronto (CA), M6C 2Z3

(73) Assignees: Eugenia Kumacheva, Toronto (CA); Hung H. Pham, Fremont, CA (US); Ilya Gourevich, Toronto (CA)

(*) Notice: Subject to any disclaimer, the term of this patent is extended or adjusted under 35 U.S.C. 154(b) by 23 days.

(21) Appl. No.: 10/758,269

(22) Filed: Jan. 16, 2004

(65) Prior Publication Data

US 2004/0165455 A1 Aug. 26, 2004

Related U.S. Application Data (60) Provisional application No. 60/443,187, filed on Jan. 29, 2003.

(51) Int. Cl.$^7$ ................................................. B32B 3/02
(52) U.S. Cl. ..................... 428/64.1; 428/64.4; 428/407; 430/270.14
(58) Field of Search ............................... 428/64.1, 64.4, 428/402, 403, 407, 913; 430/270.14, 495.1, 945

(56) References Cited

U.S. PATENT DOCUMENTS

| | | | |
|---|---|---|---|
| 6,291,132 B1 | 9/2001 | Glushko et al. | |
| 6,733,946 B2 * | 5/2004 | Kumacheva et al. | 430/138 |
| 6,785,214 B2 * | 8/2004 | Kumacheva et al. | 369/103 |
| 2001/0043495 A1 | 11/2001 | Kumacheva et al. | |
| 2001/0043546 A1 | 11/2001 | Kumacheva et al. | |
| 2003/0136946 A1 * | 7/2003 | Kumacheva | 252/500 |
| 2003/0194578 A1 * | 10/2003 | Tam et al. | 428/690 |

OTHER PUBLICATIONS

Kalinina O et al.: "A core–shell approach to producing 3D polymer nanocomposites" Macromolecules, American Chemical Society. Easton, US, vol. 32, No. 12, 1999, pp. 4122–4129.

\* cited by examiner

*Primary Examiner*—Elizabeth Mulvaney
(74) *Attorney, Agent, or Firm*—Lynn C. Schumacher; Will & Schumacher (57) ABSTRACT

An optical data storage device comprised of periodic nanostructured polymer-based material produced from core-shell particles containing one dye in the core and a second dye in the shell. The combinations of dyes can be UV-Vis-dyes or Vis-NIR or UV-NIR. It is shown that selective single-photon photobleaching of the two dyes leads to increase in density of data storage and allows one to employ single-photon photobleaching to achieve the same storage density as in two-photon-writing.

54 Claims, 8 Drawing Sheets

MULTICOLORED POLYMER NANOCOMPOSITES FOR OPTICAL MEMORY STORAGE AND SECURITY DATA ENCRYPTION

CROSS REFERENCE TO RELATED U.S. APPLICATIONS

This patent application relates to, and claims the priority benefit from, U.S. Provisional Patent Application Ser. No. 60/443,187 filed on Jan. 29, 2003, which is incorporated herein by reference in its entirety.

FIELD OF THE INVENTION

The present invention relates to a medium for optical data storage device comprised of periodic nanostructured polymer-based material produced from core-shell particles containing one dye in the core and a second dye in the shell, or in the case of multiple shells, a different dye in each of the shells. More particularly, the present invention provides a method of recording or storing data in the optical storage device made of dye containing core-shell structural units using selective single- or two-photon photobleaching of two, three or more dyes.

BACKGROUND OF THE INVENTION

Fast progress in information technologies triggers the need for new materials for high-density optical memory storage (see for example Albota, M. et al., *Science* 1998 281, 1653; C. E. Olson, M. J. R. Previte, J. T. Fourkas. *Nature Materials* 1, 2002, 225; S, Kawata, Y. Kawata, *Chem. Rev.* 2000, 100, 1777; *Photoreactive Materials for Ultrahigh-Density Optical Memory*, Ed. M. Irie, Elsevier, Amsterdam, 1994; A. Renn,; U. P. Wild, A. Rebane. *Chem. Rev.* 2000, 100, 1741; D. S. Tyson, C. A. Bignozzi, F. N. Castellano, *J. Am. Chem. Soc.* 2002, 124, 4562; and J. R. Sheats, P. F. Barbara, *Acc. Chem. Res.* 1999, 32, 191).

An increase in storage capacity can be achieved by shifting from two-dimensional to three-dimensional (3D) optical data storage: holographic recording with photorefractive media (Photorefarctive materials and Their Applications I, edited by P. Gunter and J.-P. Huignard (Springer, Berlin, 1988)), spectral hole burning (Persistent Spectral Hole Burning: Science and Applications, edited by W. E. Moerner (Springer, Berlin, 1987)) and photon echo (R. Kachru and M. K. Kim, Opt. Lett 28, 2186 (1989)).

An increase in storage density has been further accomplished by the use of two-photon processes introduced by Rentzepis (D. A. Parthenopoulos and P. M. Rentzepis, Science 245, 843 (1989); A. S. Dvornikov and P. M. Rentzepis, Opt. Commun. 119, 341 (1995)) and Webb, (W. Denk, J. H. Strickler, W. W. Webb, Science 248, 73 (1990)). On the materials side, new modes in data storage have been examined by employing polymer photonic crystals (B. Siwick, O. Kalinina, E. Kumacheva, R. J. D. Miller, J. Noolandi, *J. Appl. Phys.* 90 5328 (2001); N. I. Koroteev, S. A. Krikunov, S. A. Magnitskii, D. V. Malakhov, V. V. Shubin, Jpn. J. Appl. Phys. Part 1 37, 2279–2280 (1998), and D. Kraemer, B. Siwick, Miller R. J. D. *J. Chem. Phys.* 285, 73 (2002). These crystals can be prepared via "bottom-to-top" approach from the core-shell latex particles with fluorescent cores and optically inert shells (Kalinina, O., Kumacheva, E. *Macromolecules* 32, 4122–4129 (1999); Kumacheva, E., Kalinina, O., Lilge, L. *Adv. Mater.* 11, 231–234 (1999)). Encryption or recoding of information in 3D polymer photonic crystals was achieved by local one-photon or two-photon photobleaching of the fluorescent dye localized in periodic domains (bits). The existence of the "dead" space between the bits, acting as a barrier to crosstalk, led to a two-fold increase of signal-to-noise ratio compared to the material with a uniform dye distribution.

Moreover, information retrieval with an order of magnitude beyond the Rayleigh limit was recently predicted due to photobleaching of domains with well-defined Fourier components (Kraemer D. Kraemer, B. Siwick, Miller R. J. D. *J. Chem. Phys.* 285, 73 (2002)).

The use of bicolored (or multicolored) multiphase periodic medium for bit-like optical data storage has several advantages. First, in the bit-like binary memory storage, reading is achieved by distinguishing between "1" s (photobleached domains) and "0" (fluorescent domains) (B. Siwick, O. Kalinina, E. Kumacheva, R. J. D. Miller, J. Noolandi, *J. Appl. Phys.* 90 5328 (2001). Thus reading of optically-inert (non-fluorescent) matrix is similar to reading of "1" s; this uncertainty may induce errors in retrieving information. The incorporation of the second dye in the matrix of the photonic crystal resolves this problem. More important, the use of several dyes with distinct excitation and emission peaks increases the number of modes in data storage from 2 (binary encryption mode, one-dye system) to $2^n$ (binary code, multi-dye system), where n is the number of dyes. The incorporation of different dyes in different phases of the material reduces energy transfer between them. Data recording achieved by photo-induced changes in different dyes accompanied by information retrieval at a particular well-defined wavelength tailors additional security features to the recorded information.

Patent Publication WO 03/044276 discloses a procedure for preparation of a paper containing security elements (photoluminescent objects such as fiber, thread, rod, tape, film, windows and combination of thereof) by their incorporation into paper structure. Authenticity of the paper is then determined using polarized light.

JP 2002317134 discloses a fluorescent ink composition comprising a non-fluorescent dye absorbing in a visible range and fluorescent dye with no absorption in the visible range and fluorescence in the visible range. Authenticity of the document is determined by irradiating it with a light source capable of exciting fluorescent dye and observing an emission.

JP 2002088688 discloses a composition for laser printing with toner particles mixed with or coated by fluorescent dye or pigment absorbing in UV range. Authenticity of the document is checked by exciting the UV dye and observing fluorescence.

WO 01/09435 discloses a security paper comprising at least two of the following security features: a water insoluble dye which is incorporated in the paper and bleeds when placed in contact with organic solvent; a dye that becomes fluorescent in daylight when brought in contact with alkaline substance; a dye which becomes fluorescent when exposed to UV light.

None of above-mentioned patents teaches or suggests information encryption using multiple imaging and selective photobleaching. All features are used to prove authenticity of the document or paper whereas the material produced in accordance with the present invention can be used to identify a document holder and demonstrate the authenticity of the document.

US2003/0183695 discloses a method for making a secure ID card with multiple images. The multicolored images are printed on the information-bearing layer in such a way as to provide multiple images when printed information is viewed at different predetermined angles through the lenticular lens. This method does not use selective photobleaching of fluorescent dyes. There is a high probability that the images can be viewed all together or one by one when different angles are used.

Patent publication WO 03101755 discloses an article for authentication (e.g. security document or sheet made from a transparent polymeric film which comprises a first luminescent material in a first region and a second luminescent material in a second region. The second region contains a transparent window and the rest of the material is optionally opacified. The two materials luminesce at different visible wavelengths when excited (e.g. the coating fluoresces red/orange when excited with UV-C at 254 nm whereas the window fluoresces blue when excited with UV-A at 365 nm). However when the article is folded the first region is viewed through the transparent window and when excited the combined luminescence of both materials is seen as a colour change which may be used to authenticate the article. This method provides only one authentication feature: the color of fluorescence which is not easy to identify without expensive equipment.

It would be particularly advantageous to provide an optical data storage device and a method of writing or storing data in the optical storage device using selective single-photon or two-photon photobleaching.

SUMMARY OF THE INVENTION

It is an object of the present invention to provide an optical data storage device comprised of periodic nanostructured polymer-based material produced from core-shell particles containing one dye in the core and a dye in each different shell around a given core and a method of writing or storing data in this material using selective single- or two-photon photobleaching of the two or more dyes.

In one aspect of the present invention there is provided a 3D optical data storage device comprised of periodic nanostructured polymer-based material comprised of colloidal core-shell particles containing one dye in the core and a second dye in the shell.

In another aspect of the invention each colloidal particle may have a multilayered shell with a different dye in each shell.

In this aspect of the invention the core-shell particles may be made of polymer materials.

The present invention also provides a method of storing information in a 2D or 3D optical data storage device comprised of periodic nanostructured polymer-based material comprised of colloidal core-shell particles containing one dye in the core and a second dye in the shell, the method including the steps of selective single photon photobleaching of the two dyes.

The present invention provides an optical data storage device, comprising a nanostructured material having colloidal core particles embedded in at least one shell material with the colloidal core particles forming an array throughout the shell material, the at least one shell materials forming a continuous phase in which the colloidal core particles are embedded. The colloidal core particles include first light sensitive molecules incorporated therein with an absorption maximum at a first wavelength $\lambda_1$, and a region of the at least one shell material in close proximity to each colloidal particle including at least second light sensitive molecules incorporated with an absorption maximum at a second wavelength $\lambda_2$ different from the first wavelength.

The present invention also includes a method of producing an optical data storage device, comprising the steps of:

incorporating first light sensitive molecules into colloidal core particles;

incorporating second light sensitive molecules into at least one shell forming material;

encapsulating the colloidal core particles in the at least one shell forming material; and producing a periodic array of the encapsulated colloidal core particles, and processing the periodic array in such a way that the at least one shell forming material forms a continuous phase in which the colloidal core particles are encapsulated.

The present invention provides a method of storing information in an optical data storage device comprised of nanostructured polymer-based material comprised of an array of colloidal core-shell particles with colloidal cores containing one dye and at least one shell around each colloidal core containing at least a second dye, the at least one shell forms a continuous phase in which the colloidal core particles are embedded, the method including the steps of selective photon photobleaching of at least one of the two dyes in a pre-selected region of the array.

BRIEF DESCRIPTION OF THE DRAWINGS

The method of synthesis of confined colloidal crystals according to the present invention will now be described, by way of example only, reference being made to the accompanying drawings, in which:

FIGS. 3A, B and C shows recording of information accomplished by selective photobleaching of visible and near-IR dyes localized in different phases of the nanostructured recording medium of FIG. 1. In 3A the letter "K" was written by photobleaching nbd in the core-forming polymer ($\lambda_{exc}$=458 nm), in the image in 3B the letter "E" was written by photobleaching. Nile blue in the shell-forming polymer ($\lambda_{exc}$=633 nm), the image in 3C shows the superimposed letters without notable cross-talk between them. Scale bar is 2 $\mu$m.

FIGS. 4A, B and C show recording of information accomplished by selective photobleaching of UV- and visible dyes localized in different phases of the nanostructured recording medium of FIG. 1. The addressed plane is located 30 $\mu$m below the film surface. In 4A the letter "P" was written by photobleaching anthracene in the core-forming polymer ($\lambda_{exc}$=364 nm); in 4B the letter "H" was written by photobleaching NBD in the shell-forming polymer ($\lambda_{exc}$=488 nm); in 4C image shows spatially superimposed letters without visible overlap between them. Scale bar is 2 µm.

DETAILED DESCRIPTION OF THE INVENTION

Notations

CFP refers to a core-forming polymer. SFP refers to a shell-forming polymer.

AN is anthracene.

MA refers to methacrylate (a monomer used for sysntehsis of poly (methyl methacrylate).

NBD is 2-[methyl-(7-nitro-2,1,3-benzooxadiazol)-4-ylamino]ethyl 2-methacrylate.

NILE BLUE is hexanesulfonic acid, diethyl-[5-(2-methyl-acryloylamino)-benzo[a]phenoxazin-9-ylidene)-ammonium salt PMMA is poly(methyl methacrylate)

PBMA is poly(butyl methacrylate)

P(MMA-co-BMA) is poly(methyl methacrylate-co-butyl methacrylate).

Disclosed herein is an optical data storage device comprised of periodic nanostructured polymer-based material produced from core-shell particles containing one dye in the core and a second dye in the shell or containing one dye in the core and two other dyes in the two consecutive shells. The combinations of dyes can be ultraviolet-visible (UV-Vis) dyes or visible-near infrared (Vis-NIR) or UV-NIR, OR UV-Vis-NEAR-IR. It is shown that selective single-photon photobleaching of the two dyes leads to increase in density of data storage and allows one to employ single-photon photobleaching to achieve the same storage density as in two-photon-writing. Strictly speaking, this approach can be used without high-resolution photobleaching of individual fluorescent beads in applications such as encryption of information in documents and labels for security purposes.

The size of photobleached features can vary from several microns to millimeters or even centimeters; the advantage is in spatial superimposing of different features produced by selective photobleaching of different dyes avoiding their spectral overlap.

Synthesis of Dye Containing Core-Shell Arrays

The arrays used to produce the multidye systems for optical data storage and security needs comprise different dyes in the core and in the shell or shells to produce a multidye nanostructured material with a periodic structure. The incorporation of dyes in different phases of the material minimizes energy transfer in the recording medium, while a highly regular structure of the material provides high-resolution recording. The composite material has promising applications as a medium for data storage in information technologies and as a storage medium for security purposes.

Core-shell latex particles were synthesized using a multistage surfactant-free emulsion polymerization. U.S. Pat. Nos. 5,952,131 and 6,214,500, both entitled Core and shell matrix compositions and processes disclose methods of making core-shell matrix compositions, and both references are incorporated herein in their entirety by reference.

Both CFP and SFP were cross-linked with a small amount of ethylene glycol dimethacrylate. The $Tg_{,CFP}$ and $Tg_{,SFP}$ were 130° C. and 70° C., respectively. To obtain particles containing vis/near-IR dyes, the CFP was copolymerized with 2-[methyl-(7-nitro-2,1,3-benzooxadiazol-4-ylamino] ethyl 2-methacrylate (NBD-MA) in concentration 0.04 mol % and the SFP was copolymerized with 1-hexanesulfonic acid, diethyl-[5-(2-methyl-acryloylamino)-benzo[a]phenoxazin-9-ylidene)-ammonium salt (NileBlue-MA) in concentration 0.08 mol %. For particles comprising UV/vis dyes, the CFP was copolymerized with 0.74 mol % of 9-anthryl methyl methacrylate (AN-MA) and the SFP was copolymerized NBD-MA. A similar procedure was used for synthesis of three-dye latex particles. The dimensions of the core-shell particles were characterized by photon-correlation spectroscopy (Zetasizer 3000, Malvern Instruments, UK) and Scanning Electron Microscopy (Hitachi S-570).

Figure 1A:
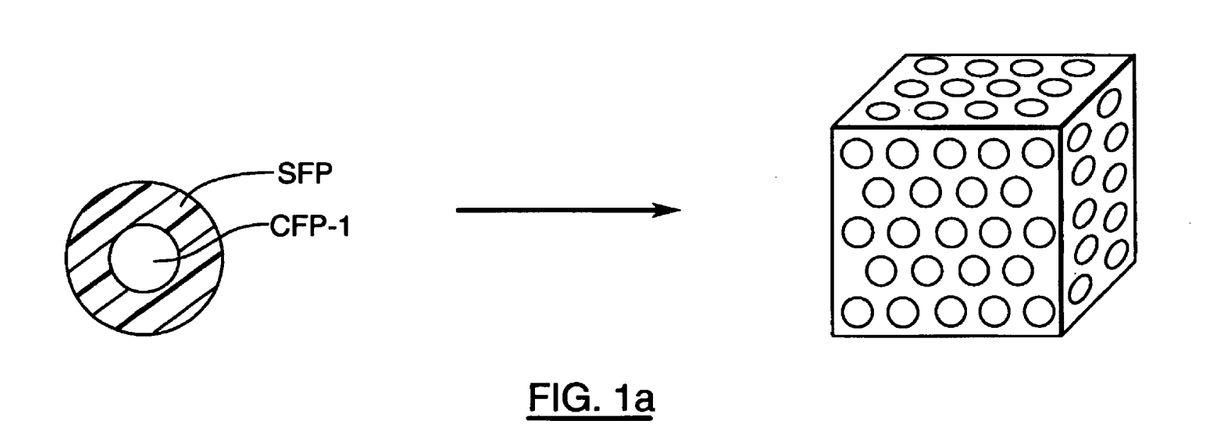
FIG. 1(a) is a schematic representation of the design principles for producing a multi-dye recording medium using a colloidal core particle and one concentric shell enveloping the colloidal core particle with light sensitive molecules in the core and the shell.
Figure 1B:
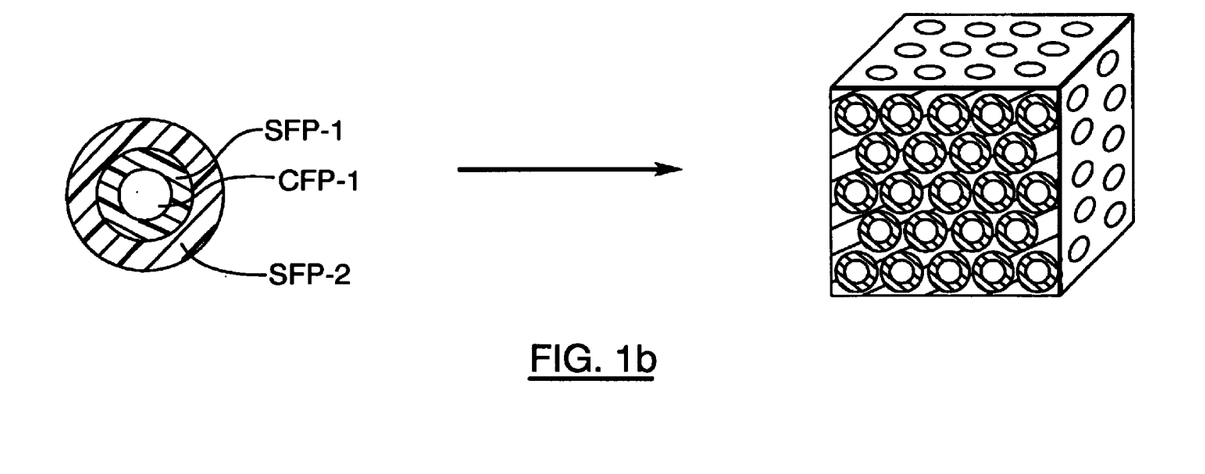
FIG. 1(b) is a schematic representation of the design principles for producing a multi-dye recording medium using a colloidal core particle and two concentric shells enveloping the colloidal core particle as the functional building unit with light sensitive molecules in the core and each of the two shells.
Figure 1C:
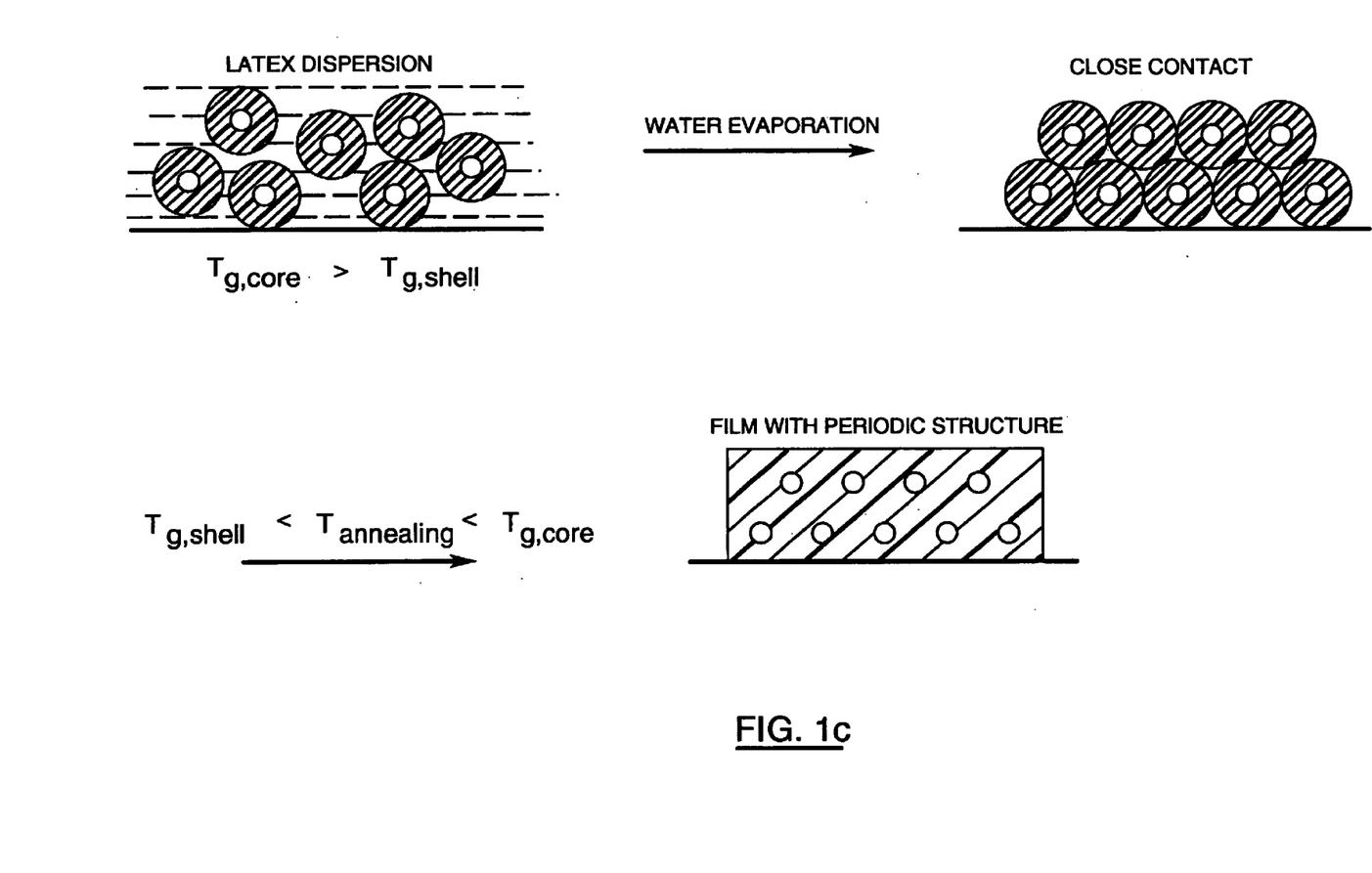
FIG. 1(c) is a schematic representation of preparation of multicolored polymer nanocomposite material for optical memory storage and/or security data encryption.

FIGS. 1(a), 1(b) and 1(c) show the approach used to create a multidye mutiphase recording medium. FIG. 1(a) shows a core-shell particle with two fluorescent dyes. Dye 1 is incorporated in the core-forming polymer (CFP) and Dye 2 is localized in the shell-forming polymer (SFP). The specific relationship between the compositions of the CFP and the SFP provides the relationship $Tg_{,SFP}<Tg_{,CFP}$ where $T_{g, SFP}$ and $T_{g, CFP}$ are the glass transition temperatures of the SFP and the CFP, respectively. Heat processing of a close-packed array of particles under conditions $T_{g,SFP}<T<T_{g,CFP}$, produces a two-phase film: a periodic array of spherical domains labeled with Dye 1, which are embedded in a matrix containing Dye 2.

FIG. 1(b) shows a three-dye particle used to produce a 3D array using a rigid core (CFP-1) which contains Dye 1, an inner shell (SFP-1) comprises Dye 2, and an outer matrix-forming shell (SFP-2) carries Dye 3. Annealing of the array of these microspheres at $T_{g, SFP-2}<T<T_{g,SFP-1}\leq T_{g,CFP}$ yields a material with three phases containing three different dyes. Selective photo-bleaching of dyes localized at the same spot of the two-or three-dye material yields 4 or 8 storage modes, respectively, given that the size of a photo-addressed spot exceeds the size of a microsphere.

FIG. 1(c) shows three stages in formation of a nanostructured composite material, which involve particle synthesis, ordering of colloid particles using e.g. their sedimentation and drying to form a close-packed periodic array of colloid beads, and heat processing of this array to produce polymer composite material with ordered array of dye-labeled microspheres embedded into a photoactive matrix.

More generally, multilayer polymer shells can be grown around a colloidal core particle with each shell labeled with different dye maintaining the specific relationship between the compositions of the core forming polymer and the outer shell forming to fulfill the relationship $T_{g, SFP} < T_{g, CFP}$. Glass transition temperatures of the intermediate shells however should be higher than that of an outer shell. That is $T_{g,outer\ SFP} < T_{g,inter.sells} \leq T_{g,CFP}$. Thus, heat processing will result in a close-packed array of particles under conditions $T_{g,outer\ SFP} < T_{processing} < T_{g,inter.shells}$, $T_{g,CFP}$ which are embedded in a matrix-containing dye. The core size should be kept in the range of 200–300 nm and the thickness of each intermediate shells should be around 100 nm. Since lateral resolution is $$r_{xy} \approx \frac{0.4\lambda_{em}}{NA},$$

where $\lambda_{em}$ is the emission wavelength and NA is the numerical aperture of the objective lens and if the size of the core with intermediate multilayer shells is kept ~500 nm then each individual layer will not be resolved and will appear as a bright spot of different color depending on the excitation and emission wavelengths ($\lambda_{ex}$ and $\lambda_{em}$) and the set of filters used. Thus every bead can be used several times for selective photobleaching if each dye can be selectively addressed.

Covalent attachment of the fluorescent molecules to a polymer backbone can be used for the purpose of decreasing diffusion of the dyes through the interface between the core and the shell or shells, which prevents or decreases nonradiative energy transfer between the dyes and thus crosstalk.

In addition, when multiple shells are used, in one embodiment of the invention possible nonradiative energy transfer or/and crosstalk can be reduced or eliminated by incorporating light sensitive molecules in every other shell so that an inert shell separates shells containing fluorescent molecules. In the above-described strategy, the localization of dyes in different phases of the material can be achieved by the covalent attachment of each dye to its hosting polymer and polymer crosslinking. The dimensions of the dye-labeled phases should be sufficiently large to be spatially resolved with optical techniques. For instance, for confocal fluorescence microscopy the lateral resolution is $$r_{xy} \approx \frac{0.4\lambda_{em}}{NA},$$

where $\lambda_{em}$ is the emission wavelength and NA is the numerical aperture of the objective lens (Jonkman J. E. N. & Stelzer. E. H. K. Resolution and Contrast in Confocal and Two-Photon Microscopy. In *Confocal and Two-Photon Microscopy: Foundations, Applications and Advances,*" Ed. Alberto Diaspro, Wiley-Liss, New York, 2002, p. 109). Finally, to avoid cross-talk, the dyes localized in different phases should have a sufficient spectral window.

Three types of core-shell particles were synthesized to illustrate the present invention. In the first system, particle cores and shells contained anthracene (UV-dye) and NBD (visible dye), respectively; in the second system, particle cores and shells were labeled with NBD and NileBlue (near-IR dye), respectively; in the third system particle cores were labeled with anthracene (UV-dye), intermediate shell was labeled with NBD (visible dye), and the outer shell was labeled with NileBlue (near-IR dye). The CFP was poly (methyl methacrylate) (PMMA) and the SFP was a copolymer of poly(methyl methacrylate-co-butyl methacrylate) [P(MMA-co-BMA)].

The method of preparing particle arrays with dyes incorporated into the core and shell(s) will now be further illustrated using the following non-limiting Examples 1 to 4.

EXAMPLE 1

Procedure for Preparation of Latex Particles Containing a UV Dye (Anthracene) in the Core and a Visible Dye (NBD) in the Shell.

Dye-labeled core-shell particles were prepared using a four-stage surfactant-free emulsion polymerization. In the first stage I, 0.20 grams ammonium persulfate, 0.25 grams sodium hydrogen carbonate and 70.0 grams deionized water were weighed into a 250 mL jacketed 3-neck round bottom flask equipped with reflux condenser, mechanical stirrer and nitrogen inlet. The flask was brought to 80° C. using a circular bath, while the solution was purged with a gentle nitrogen stream under mechanical stirring at 280 rpm. When the solution was stable at 80° C., a monomer mixture (7.75 grams methyl methacrylate, 0.151 grams 9-anthryl methacrylate, 0.078 grams ethylene glycol dimethacrylate, 0.021 grams t-butyl dodecylthiol) was fed via a feeding pump. When the feeding was completed (1.0–1.5 hour), the reaction was hold at 80° C. for 5 min and then cooled to room temperature.

In the stage II, 40.0 grams of the dispersion from stage I, 0.20 grams sodium hydrogen carbonate and 100.0 grams deionized water were weighed into a 500 mL jacketed 3-neck round-bottom flask equipped with reflux condenser, mechanical stirrer and nitrogen inlet. The flask was brought to 80° C. and the dispersion was purged with a nitrogen stream under mechanical stirring at 280 rpm. When the solution was stable at 80° C., a monomer solution (29.25 grams methyl methacrylate, 0.569 grams 9-anthryl methacrylate, 0.292 grams ethylene glycol dimethacrylate, 0.079 grams t-butyl dodecylthiol and 0.05 grams 2,2'azobis (2-methylproprionitrile)) was fed via a feeding pump. The feeding took about 3–4 h. When it was completed, the reaction was hold at 80° C. for 0.5 h and then cooled to room temperature. The dispersion was filtered and stored in a 500 mL brown bottle.

In the stage III, 30.0 grams of the dispersion from stage II, 0.20 grams sodium hydrogen carbonate and 100.0 grams deionized water were weighed into a 500 mL jacketed 3-neck round bottom flask equipped with reflux condenser, mechanical stirrer and nitrogen inlet. The flask was brought to 80° C. and the dispersion was purged with a nitrogen stream under mechanical stirring at 280 rpm. When the solution was stable at 80° C., a monomer solution (3.75 grams methyl methacrylate, 1.25 grams n-butyl methacrylate, 0.1 grams ethylene glycol dimethacrylate, 0.013 grams t-butyl dodecylthiol and 0.05 grams 2,2'azobis (2-methylproprionitrile)) was fed via a feeding pump. The feeding took about 45 min–1 h. At the same time, a water solution (10.0 grams deionized water, 0.2 grams ammonium persulfate and 0.05 grams sodium hydrogen carbonate) was fed into the reactor via a second feeding pump. When the monomer feeding was completed, 10.0 mL of the dispersion was withdrawn by a syringe. Immediately a monomer mixture (10.0 grams methyl methacrylate, 10.0 grams n-butyl methacrylate, 0.02 grams 2-[methyl-(7-nitro-2,1,3-benzooxadiazol-4-ylamino]ethyl 2-methyl methacrylate (NBD-MA), 0.3 grams ethylene glycol dimethacrylate, 0.05 grams t-butyl dodecylthiol and 0.1 grams 2,2'azobis(2-methylproprionitrile)) was fed to the reactor (Stage IV). The monomer feeding took 3.5–4.0 h while the aqueous feeding was about 4.5–5.0 h. The reaction was hold at 80° C. for 0.5 h and then cooled to room temperature. The dispersion was filtered and stored in a 500 mL brown bottle.

EXAMPLE 2

Procedure for Preparation of Latex Particles Containing a Visible Dye (NBD) in the Core and a Near Infrared Dye (Nile Blue) in the Shell.

Dye-labeled core-shell particles were prepared using a four-stage surfactant-free emulsion polymerization. In the first stage I, 0.20 grams ammonium persulfate and 70.0 grams deionized water were weighed into a 250 mL jacketed 3-neck round-bottom flask equipped with reflux condenser, mechanical stirrer and nitrogen inlet. The flask was brought to 80° C. using a circular bath, while the solution was purged with a gentle nitrogen stream under mechanical stirring at 280 rpm. When the solution was stable at 80° C., a monomer mixture (7.75 grams methyl methacrylate, 0.008 grams NBD-MA, 0.021 grams ethylene glycol dimethacrylate, 0.021 grams t-butyl dodecylthiol) was fed via a feeding pump. When the feeding was completed (1.0–1.5 hour), the reaction was hold at 80° C. for 5 min and then cooled to RT.

In the stage II, 40.0 grams of the dispersion from stage I, 0.03 grams sodium hydrogen carbonate and 100.0 grams deionized water were weighed into a 500 mL jacketed 3-neck round bottom flask equipped with a mechanical stirrer, a reflux condenser with the top connected to a nitrogen outlet, and a nitrogen inlet. The flask was brought to 80° C. and the dispersion was purged with a nitrogen stream under mechanical stirring at 280 rpm. When the solution was stable at 80° C., a monomer solution (29.25 grams methyl methacrylate, 0.032 grams NBD-MA, 0.079 grams ethylene glycol dimethacrylate, 0.079 grams t-butyl dodecylthiol and 0.05 grams 2,2'azobis(2-methylprionitrile)) was fed via a feeding pump. The feeding took about 3–4 h. When it was completed, the reaction was hold at 80° C. for 0.5 h and then cooled to room temperature. The dispersion was filtered and stored in a 500 mL brown bottle.

In the stage III, 30.0 grams of the dispersion from stage II and 100.0 grams deionized water were weighed into a 500 mL jacketed 3-neck round bottom flask equipped bottom flask equipped with a mechanical stirrer, a reflux condenser with the top connected to a nitrogen outlet, and a nitrogen inlet. The flask was brought to 80° C. and the dispersion was purged with a nitrogen stream under mechanical stirring at 280 rpm. When the solution was stable at 80° C., a monomer solution (3.75 grams methyl methacrylate, 1.25 grams n-butyl methacrylate, 0.1 grams ethylene glycol dimethacrylate, 0.013 grams t-butyl dodecylthiol and 0.05 grams 2,2'azobis(2-methylprioprionitrile)) was fed via a feeding pump. The feeding took about 45 min–1 h. At the same time, a water solution (10.0 grams deionized water and 0.25 grams ammonium persulfate) was fed into the reactor via a second feeding pump. When the monomer feeding was completed, 10.0 mL of the dispersion was withdrawn by a syringe. Immediately a monomer mixture (10.0 grams methyl methacrylate, 10.0 grams n-butyl, methacrylate, 0.1 grams Nile Blue-MA, 0.3 grams ethylene glycol dimethacrylate, 0.05 grams t-butyl dodecylthiol, 0.4 grams methacrylic acid and 0.1 grams 2,2'azobis(2-methylprioprionitrile)) was fed to the reactor (Stage IV). The monomer feeding took 3.5–4.0 h while the aqueous feeding was about 4.5–5.0 h. The reaction was hold at 80° C. for 0.5 h and then cooled to room temperature. The dispersion was filtered and stored in a 500 mL brown bottle.

EXAMPLE 3

Procedure for Preparation of Latex Particles Containing a UV Dye (Anthracene) in the Core, a Visible Dye (NBD) in the Intermediate Shell, and a Near Infrared Dye (Nile Blue) in the Outer Shell.

Dye-labeled core-shell particles were prepared using a five-stage surfactant-free emulsion polymerization. In the first stage I, 250 mL jacketed 3-neck round-bottom flask equipped with a mechanical stirrer, a reflux condenser fitted with a nitrogen outlet, and a nitrogen inlet was purged with nitrogen and charged with 0.20 grams of ammonium persulfate, 0.25 grams of sodium hydrogen carbonate and 70.0 grams of deionized water. A positive nitrogen pressure was maintained during the reaction. The flask was heated up to 80° C. using a circular bath. The mechanical stirring was held constant at 280 rpm. When the temperature was stabilized, a monomer mixture (37.0130 grams methyl methacrylate, 0.7198 grams 9-anthryl methacrylate, 0.4275 grams ethylene glycol dimethacrylate, 0.1006 grams t-butyl dodecylthiol) was fed via a feeding pump. When the feeding was completed (3.5–4.5 hour), the reaction was held at 80° C. for 30 min and then cooled to room temperature. The dispersion was filtered and stored in a 150 mL brown bottle.

In the stage II, 30.0 grams of the dispersion from stage I, 0.20 grams sodium hydrogen carbonate and 100.0 grams deionized water were weighed into a 500 ml jacketed 3-neck round bottom flask equipped with a mechanical stirrer, a condenser fitted with a nitrogen outlet, and a nitrogen inlet. A positive pressure of nitrogen was maintained during the reaction. The flask was heated up to 80° C. using a circular bath. The mechanical stirring was held constant at 280 rpm. When the temperature was stabilized, a monomer mixture (2.5003 grams methyl methacrylate, 0.0501 grams ethylene glycol dimethacrylate, 0.0050 grams t-butyl dodecylthiol and 0.0264 grams 2,2'azobis(2-methylproprionitrile)) was fed via a feeding pump. The feeding took about 45 min–1 h. At the same time, a water solution (20.0 grams deionized water, 0.2 grams ammonium persulfate and 0.05 grams sodium hydrogen carbonate) was fed into the reactor via a second feeding pump. When the monomer feeding was completed, 10.0 ml of the dispersion was withdrawn by a syringe. Immediately a monomer mixture (2.5006 grams of methyl methacrylate, 0.0106 grams of 2-[methyl-(7-nitro-2, 1,3-benzooxadiazol-4-ylamino]ethyl 2-methyl methacrylate (NBD-MA), 0.0503 grams of ethylene glycol dimethacrylate, 0.0049 grams of t-butyl dodecylthiol and 0.0254 grams of 2,2'-azobis(2-methylproprionitrile)) was fed to the reactor (stage II). The monomer feeding took 45 min–1 h. The feeding of aqueous solution was stopped. The reaction mixture was held at 80° c. for 1 h. Then, a monomer mixture (7.5076 grams of methyl methacrylate, 7.5007 grams of n-butyl methacrylate, 0.2537 grams of ethylene glycol dimethacrylate, 0.0268 grams of t-butyl dodecylthiol and 0.052 grams of 2,2'azobis(2-methylproprionitrile)) was fed in via a feeding pump for 2 h (stage IV). The feeding of water solution was discontinued when the monomer mixture was used up. The reaction mixture was held at 80° C. for 1 h. 10 ml of the dispersion were removed with a syringe. Then, a monomer mixture (7.5076 grams of methyl methacrylate, 7.5007 grams of n-butyl methacrylate, 0.0978 grams of 1-hexanesulfonic acid, diethyl-[5-(2-methyl-acryloylamino)-benzo[a]phenoxazin-9-ylidene)-ammonium salt (nileblue-ma) (stage V), 0.2537 grams of ethylene glycol dimethacrylate, 0.0268 grams of t-butyl dodecylthiol and 0.052 grams of 2,2'azobis(2-methylproprionitrile)) was fed in using a feeding pump. Feeding continued for 3 h and after it ended the dispersion was kept for 1 hour at 80° C. and then cooled to room temperature. The dispersion was filtered and stored in a 500 ml brown bottle.

EXAMPLE 4
Procedure for the Preparation of 3D Optically Active Polymer Materials.

Latex dispersions as made in EXAMPLE 1 and EXAMPLE 2 were centrifuged three times at 4000 rpm for 2 minutes. Then the supernatant was removed and particles were redispersed in deionized water. The dispersions were then placed in plastic containers (Robotics Filter Funnel 0.45 μm PTFE, VWR Can Lab), water was allowed to evaporate at room temperature thus compacting the core-shell particles into an array. Annealing the arrays at 120° C. for 10–18 hours led to transparent films. The film formation process is shown in FIG. 1(c). The films formed from EXAMPLE 1 appeared as yellow, while those from EXAMPLE 2 appeared as navy blue.

Physical and Optical Characterization

Dimensions of latex particles were measured by scanning electron microscopy (SEM, Hitachi S-570). A drop of a dilute latex dispersion was placed on an aluminum stub, and allowed to dry. A gold coating was deposited on the surface of the dry particles.

Figure 2:
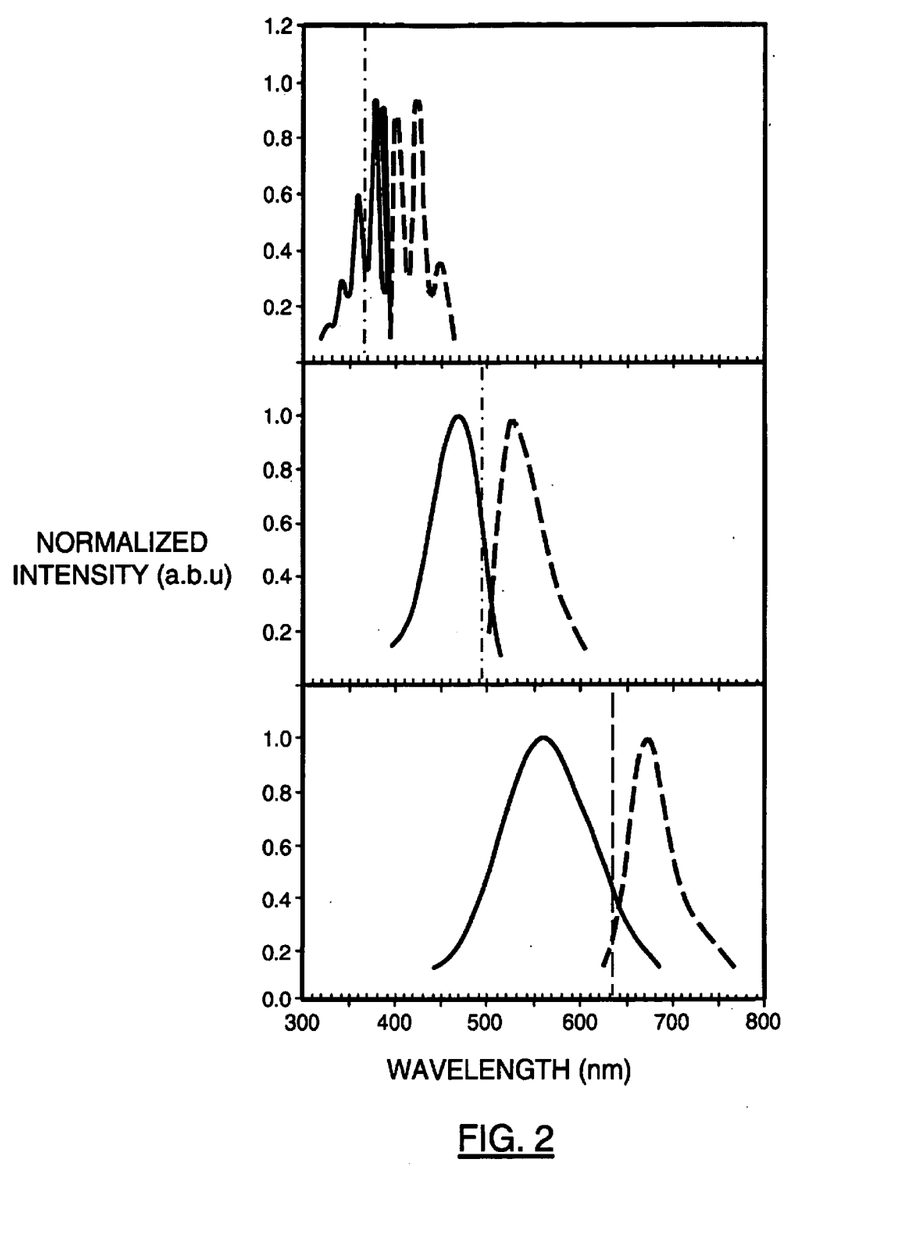
FIG. 2 shows fractions of absorption and emission spectra of dyes used for selective photobleaching (solid and dotted lines, respectively) measured for dye-labeled polymers dissolved in tetrahydrofurane. From top to bottom: anthracene-labeled PMMA, NBD-labeled poly(PMMA-co-PBMA), and nile blue-labeled poly(PMMA-co-PBMA). Dotted vertical lines show the wavelengths used for dye excitation.

Absorption and emission spectra of dyes (anthracene, NBD and NileBlue) was measured using Perkin Elmer UV/Vis Spectrometer Lambda 12 and Perkin Elmer Luminescence Spectrometer LS50B. FIG. 2 shows the excitation and emission spectra of dye-bound polymers. In general, the shape and patterns in the excitation and emission spectra of dye-bound polymers are almost identical to that of unbound ones.

In FIG. 2, from top to bottom there is shown portions of the absorption and emission spectra of AN-labeled PMMA, NBD-labeled P(MMA-co-BMA) and NileBlue-labeled P(MMA-co-BMA), respectively. The dotted vertical lines in each absorption spectrum show the wavelengths at which the dye was excited. The spectra show that spectral windows exist for the pairs AN-NBD and NBD-NileBlue, which allow for excitation of the selected dye without affecting the second one. Energy transfer from anthracene to NBD or from NBD to NileBlue is expected from the overlap of emission peak of one dye and absorption peak of the other dye. In the proposed composite material, this process is bound to the interfacial region (ca. 20 nm) between the phases.

Storage and Retrieval of Information

Two confocal microscopes (both Zeiss LSM510) were used as the writing/reading apparatuses: one equipped with a UV Argon laser ($\lambda_{exc}$=364 nm) and an Argon-ion laser ($\lambda_{exc}$=458 or 488 nm) and the other with a Helium Neon (HeNe) laser ($\lambda_{exc}$=633 nm) and an Argon-ion laser ($\lambda_{exc}$=488 nm). In high resolution writing/reading, high resolution oil (100×/1.4 NA) or water immersion lenses (63×/1.2 NA) were used with working distances of 0.1 and 0.25 mm respectively. The lateral resolution was about 0.2 microns for the UV-excited dye and about 0.3 microns for the near-IR dyes, and the pinholes were adjusted to give an optical section of about 1.0 micron for all dyes. For writing or reading of multiple dyes, an acousto-optic tunable filter scanned several laser lines simultaneously (for optimum speed) or sequentially (to minimize cross-talk between the fluorescent dyes). Reading (imaging) intensities ranged from 0.1 to 0.5 mW, whereas writing intensities were different for the three dyes, ranging from 1 to 5 mW with typically 10 iterations for the NBD dye, 20 iterations for Anthracene and up 500 iterations for the more photostable NileBlue dye.

A non-limiting exemplary procedure for selective writing information or photobleaching dyes on materials prepared from EXAMPLE 2 (NBD-labeled core/Nile Blue-labeled shell particles) may be as follows. A confocal microscope was employed as a "write-read" head using wavelengths 364 nm (UV Argon-ion laser), 488 nm (Argon-ion laser) and 633 nm (He—Ne laser). Generally, there was a 100 to 1,000-fold increase in laser intensity from the imaging (reading) mode to the writing (photobleaching) mode. While not wishing to be bound by any theory, the photobleaching process likely involves photooxidation, little is known about the detailed reaction mechanisms, which may be different for each of the three dyes we consider.

Figure 3:
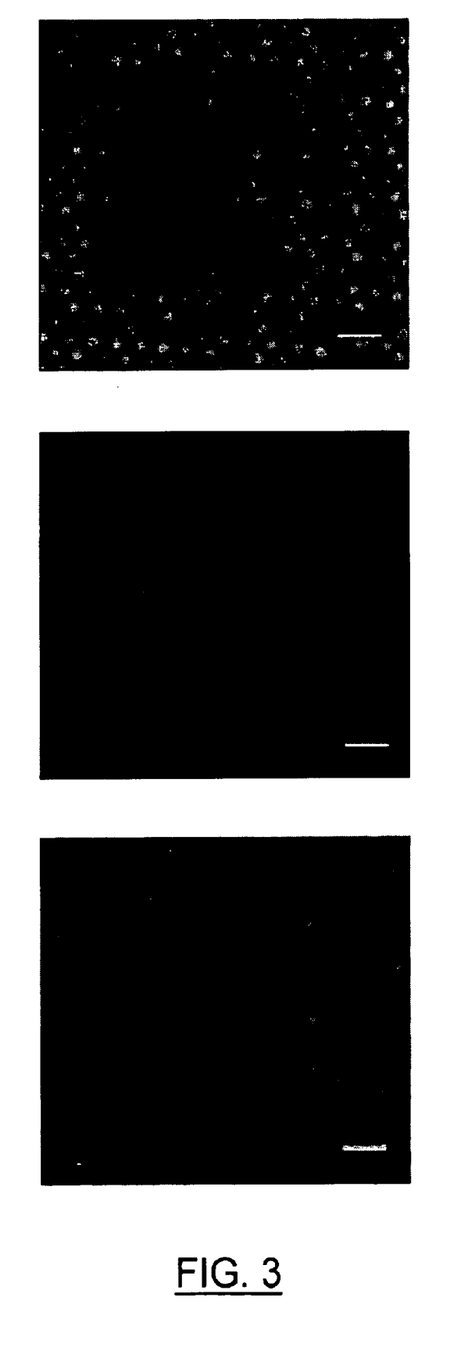

FIG. 3 (background) shows the results of imaging and recording in the medium containing visible and near-IR dyes. FIG. 3A is obtained by exciting NBD at $\lambda_{exc}$=488 nm. For emission collected in the range from 505 to 550 nm, a periodic array of bright NBD-labeled "core" particles was observed embedded in a matrix that remains optically inert under this excitation wavelength. For $\lambda_{exc}$=633 nm and emission collected for $\lambda$>650 nm, an inverse structure was observed: a bright nileblue-containing matrix and periodic dark spots of NBD-labeled particles (FIG. 3B). FIG. 3C shows spatial overlap of images from FIGS. 3A and 3B. In FIG. 3A the letter "K" was written at increased laser power by photobleaching NBD dye in the CFP particles using $\lambda_{exc}$=458 nm. The letter "E" was written on the same spot by photobleaching nileblue dye localized in the SFP matrix (FIG. 3B). The readout at 488 or 633 nm showed the letters "K" or "E", respectively. The composite image (FIG. 3C) shows superimposed letters "E" and "K" with no cross-talk between them.

The following is a description of the procedure for selective writing information or photobleaching dyes on materials prepared from EXAMPLE 1 (anthracene-labeled core/NBD-labeled shell particles). For writing information by photobleaching an anthracene dye, the 364 nm line of an argon/helium ion laser was employed (confocal fluorescence microscope zeiss 510). Laser power was in the range from 1 to 5 mw and the number of iterations was 30. For writing information by photobleaching of NBD dye, the 488 nanometer line of an argon/helium ion laser (confocal fluorescence microscope zeiss 510) with the power in the range from 1 to 5 mw was used with number of iterations being on the order of 10.

Figure 4:
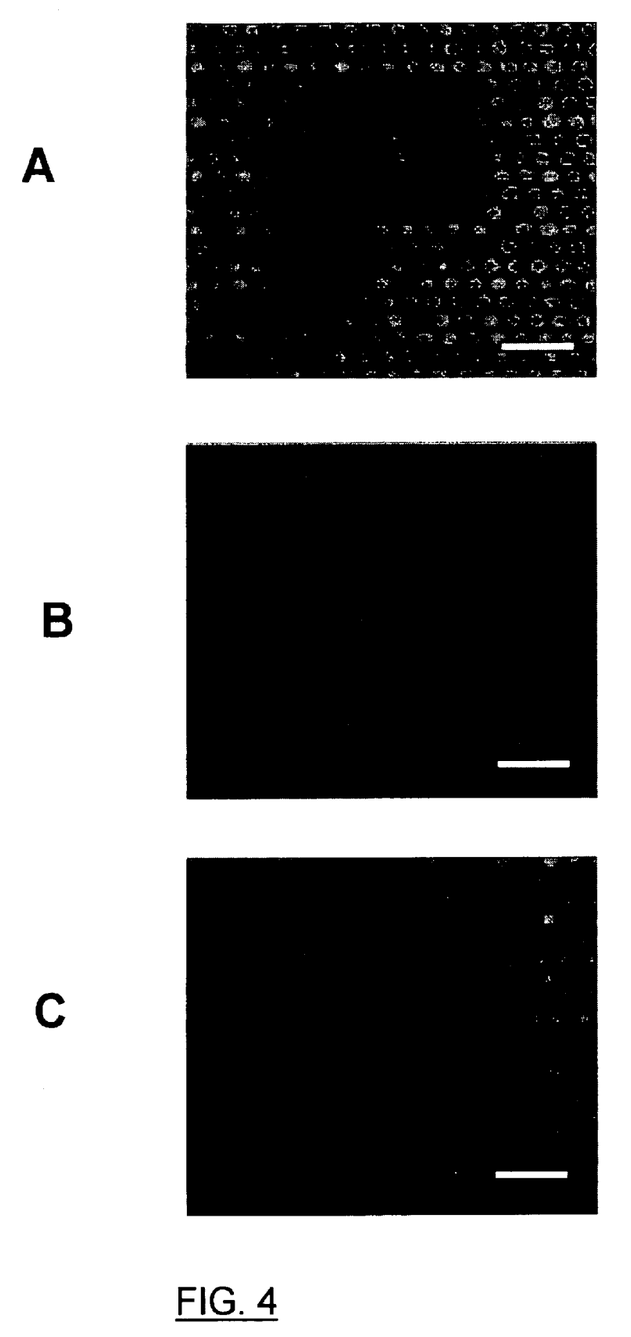

FIG. 4 shows confocal fluorescence microscopy images of the films produced by selective dye photobleaching in the nanostructured material containing AN and NBD dyes. The background in the FIG. 4A shows a "direct" structure: the array of AN-labeled particles obtained at $\lambda_{exc}$=364 nm). The letter "P" was written at increased laser power by selectively photobleaching anthracene at $\lambda_{exc}$=364 nm and read out by monitoring the emission in the spectral range from 385 to 470 nm. At this wavelength ($\lambda_{exc}$=364) only anthracene was photobleached.

FIG. 4B shows the inverse structure obtained at $\lambda_{exc}$=488 nm. The letter "H" was written on the same spot as the letter "P" shown in FIG. 4A by selectively photobleaching NBD using laser power at 488 nm and 10 iterations. Only NBD was photobleached at this wavelength. Reading was accomplished in the wavelength range from 505 to 550 nm. The overlapped letters "P" and "H" (FIG. 4C) show high selectivity in dye photobleaching for a combined readout of the letters "P" and "H" and confirms that the photobleached features are located in the same plane and spot. Thus selective photobleaching is achieved and the amount of information is doubled (the number of possible combinations is $2^2$ for two dyes as opposed $2^1$ for a single dye).

We emphasize the unique features of the described multidye multiphase material with a periodic structure by comparing it with three control systems: (i) films obtained from a solution of dye-labeled CFP and SFP, (ii) films produced from a solution of the CFP and two different dyes, and (iii) films obtained from a binary mixture of latex particles, each labeled with a different dye. The concentration of dyes and the optical settings during recording and reading were identical to those used for the material obtained from the core-shell beads.

Figure 5:
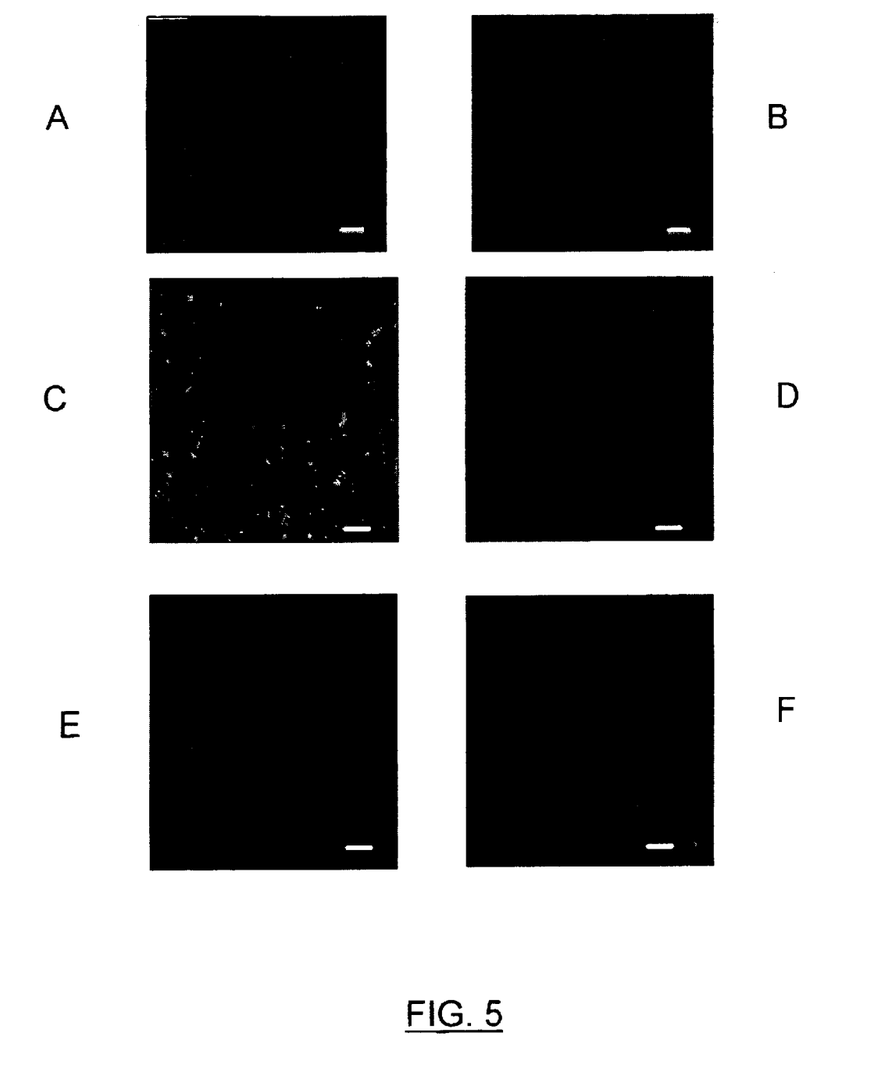
FIG. 5 shows recording accomplished by selective photobleaching of anthracene and NBD in (A,B) films cast from a tetrahydrofurane solution of dye-labeled core-forming polymer and shell-forming polymer; (B,D) films cast from a tetrahydrofurane solution of core-forming polymer, antharacene and NBD; 5E and 5F show films obtained from a mixture of latex particles of antharacene-labeled core-forming polymer and NBD-labeled shell-forming polymer. The letter "P" was written by photobleaching anthracene (A,C,E); the letter "H" was written by photobleaching nbd (B,D,F). Scale bar is 2 µm.

FIGS. 5A and 5B show the results of recording in the film formed from a solution of the AN-CFP and NBD-SFP. Macroscopic phase separation of these polymers produced large domains, each containing a single dye. Under these circumstances, selective photobleaching was practically impossible. A homogeneous film obtained from a CFP, AN and NBD (FIGS. 5C, 5D) featured reasonably good contrast for recorded patterns; however, energy transfer from AN to NBD resulted in cross-talk of the letters "H" and "P" (FIG. 5D). FIGS. 5E, 5F show the results of recording in the film obtained from the blend of dye-labeled particles. Aggregation of microspheres produced small clusters of particles labeled with the same dye and thus "noisy" background which lowered the resolution of recording. These qualitative observations were supported by comparing fluorescence intensity line profiles obtained by image analysis of the letter "H" written by photobleaching anthracene (FIG. 4 and FIG. 5).

Figure 6:
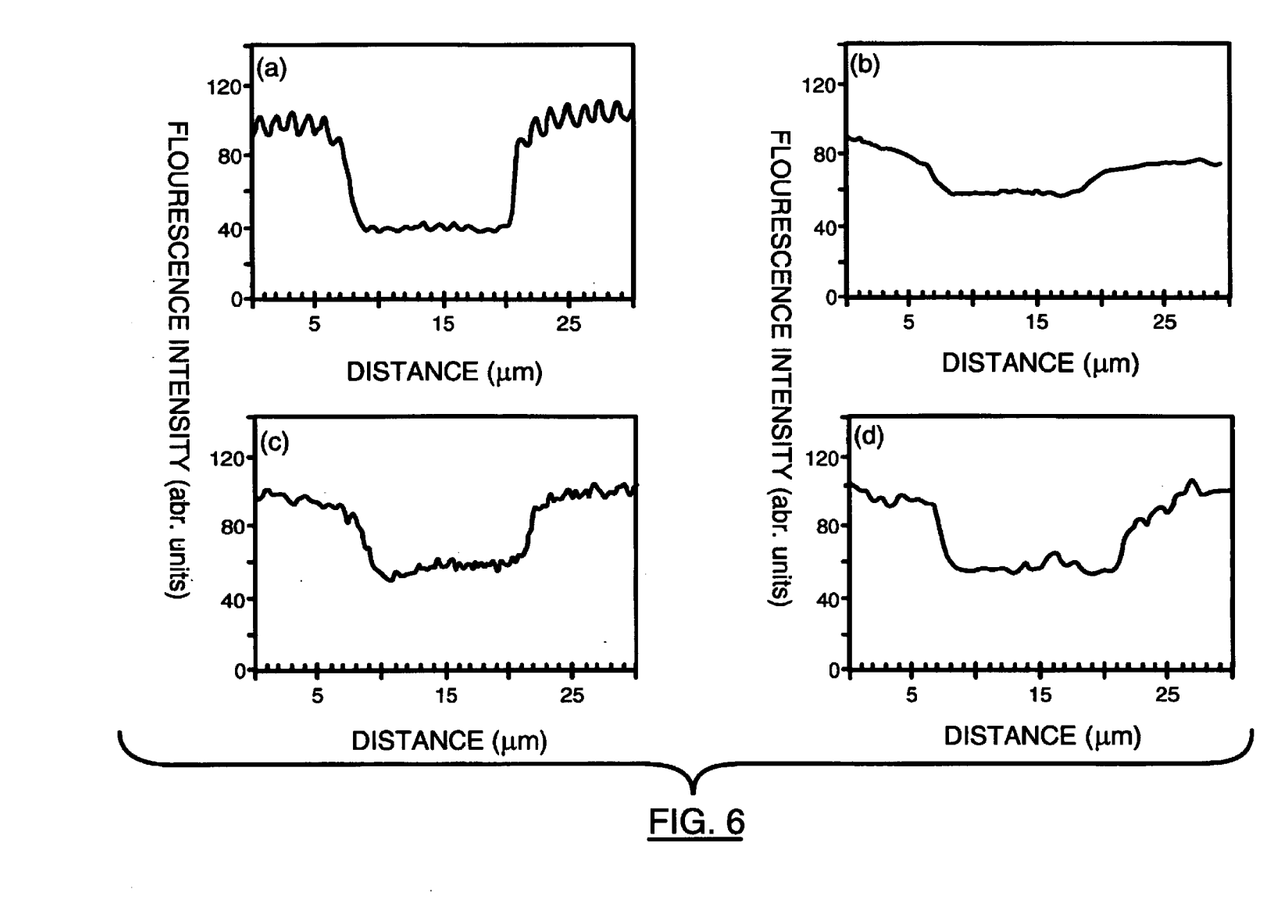
FIG. 6 shows fluorescence intensity line profiles obtained by image analysis in the center of letter "H" photobleached as in FIGS. 4 and 5 in 6(a) the periodically structured two-dye material; 6(b) in the film obtained from a solution of anthracene-labeled core-forming polymer and NBD-labeled shell-forming polymer; 6(c) in the film produced from a solution of core-forming polymer, anthracene and NBD; 6(d) in the material prepared from the blend of anthracene-labeled PMMA beads and NBD-labeled PBMA beads.

FIG. 6 shows fluorescence intensity line profiles obtained by image analysis in the center of letter "H" photobleached as in FIGS. 3 and 5 in (a) the periodically structured two-dye material; (b) in the film obtained from a solution of AN-labeled core-forming polymer and NBD-labeled shell-forming polymer; (c) in the film produced from a solution of core-forming polymer, AN and NBD; (d) in the material prepared from the blend of AN-labeled PMMA beads and NBD-labeled PBMA beads. In FIG. 6, two features of the line profiles clearly demonstrate the superior performance of the periodically structured film obtained from core-shell particles: a higher signal-to-noise ratio, defined by the ratio of the average fluorescence intensities after recording and prior to recording, and a more abrupt transition between the photobleached and non-bleached domains.

Figure 7:
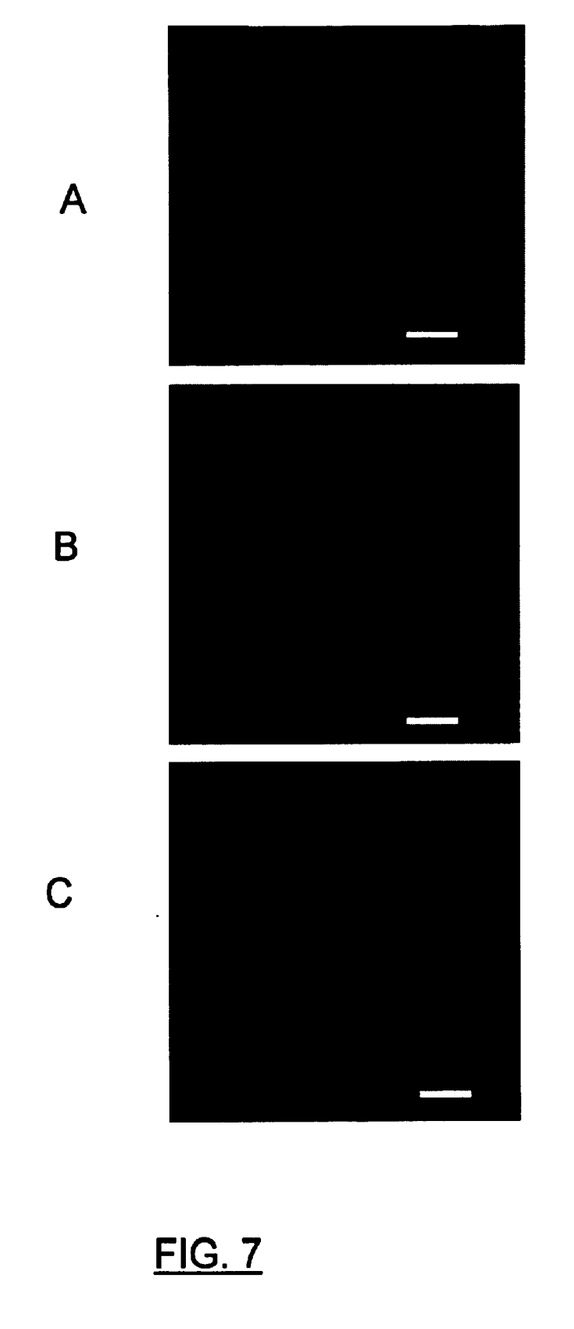
FIG. 7 shows confocal fluorescence microscopy images of three-dye three-phase periodically structured material obtained from the latex particles with anthracene-labeled 700 nm-size core, 50 nm-thick inner NBD-labeled shell (SFP-1), and 150 nm-thick nile blue-labeled outer shell (SFP-2) with the films imaged at (A) $\lambda_{exc}$=364 nm (B), $\lambda_{exc}$=488 nm, and (C) $\lambda_{exc}$=633 nm.

For the three-dye nanostructured recording medium, multiphase particles were synthesized with an AN-labeled core, an NBD-labeled inner shell, and a nileblue-labeled outer shell. FIGS. 7A, B and C show film structure imaged at $\lambda_{exc}$ 364, 488, and 633 nm, respectively. In FIG. 7A, the AN-labeled CFP appears as the bright domains, while the two other phases (SFP-1 and SFP-2) form a dark background: the dyes incorporated in these polymers absorb relatively little light at $\lambda_{exc}$=364 nm. The image in FIG. 7B is obtained using $\lambda_{exc}$=488 nm: here, only the SFP-1 carrying NBD appears bright. For $\lambda_{exc}$=633 nm, one observes a bright matrix due to emission from the SFP-2 labeled with nileblue and a periodic array of optically inert domains of the CFP and SFP-1 components (FIG. 7C). The results of "selective" imaging imply that selective photobleaching is possible at increased average intensity.

The present invention also includes the use of two-photon recording process. For UV and Vis dyes Chameleon Ultra fast Ti: Sapphire LASER (720–930 nm) was used at $\lambda_{EXC}$ from 780 to 830 NM with laser power in the range from 100 to 200 mW and number of iterations from 50 to 300 to produce two-photon induced photobleaching of the dyes (Zeiss LSM 510 META NLO MICROSCOPE). Under these conditions depth discrimination in writing process was reduced to ca. 3 microns.

The introduction of gray-scales leads to further increase in storage density or enhanced information encryption. By varying laser power or the time of photobleaching, different extent of dye photobleaching can be achieved thus providing a new degree of freedom in writing by changing the signal-to-noise ratio.

In conclusion, the present invention provides a method of optical data storage based upon a multiphase periodic recording medium. This approach allows one to record multicolored patterns on a single spot of the material and thus has greater power and versatility than binary (one or zero) data storage. The strategy can be extended to data storage based upon two-photon-induced dye photobleaching (Parthenopoulos, D. A. & Rentzepis, P. M. Three-dimensional optical storage memory. Science 245, 843–845 (1989)). For highly-demanding applications, data can be recorded pixel by pixel (Photoreactive Materials for Ultrahigh-Density Optical Memory, Ed. M. Irie, Elsevier, Amsterdam, 1994. ) whereas in fast recording, photobleaching can be achieved through masks, making this method simple and versatile. The use of gray scales provides a virtually unlimited number of patterns that can be stored in a single plane. We conclude that materials with periodic structures and multi-dye photobleaching capability have very promising applications in both the information technologies sector and for security needs. Furthermore, we expect that the described approach can be used for producing multiphase materials for photonic applications: for multidye tunable lasers, optical limiters, and micron-scale chemical sensing (R. Gvishi, U. Narang, G. Ruland, D. N. Kumar, P. N. Prasad, Appl. Organomet. Chem. 11, 107 (1997)).

As used herein, the terms "comprises", "comprising", "including" and "includes" are to be construed as being inclusive and open ended, and not exclusive. Specifically, when used in this specification including claims, the terms "comprises", "comprising", "including" and "includes" and variations thereof mean the specified features, steps or components are included. These terms are not to be interpreted to exclude the presence of other features, steps or components.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

Therefore what is claimed is:

1. An optical data storage device, comprising:
    a nanostructured material having colloidal core particles embedded in at least one shell material with the colloidal core particles forming an array throughout the shell material, the at least one shell material forming a continuous phase in which the colloidal core particles are embedded; and
    the colloidal core particles including first light sensitive molecules incorporated therein with an absorption maximum at a first wavelength $\lambda_1$, and a region of the at least one shell material in close proximity to each colloidal particle including at least second light sensitive molecules incorporated with an absorption maximum at a second wavelength $\lambda_2$ different from the first wavelength.

2. The device according to claim 1 wherein said colloidal core particles form a periodic array throughout the at least one shell material.

3. The device according to claim 2 wherein said colloidal core particles are made of a polymer material, and wherein the shell material is made of a polymer material.

4. The device according to claim 3 wherein the first and second light sensitive molecules are molecules which fluoresce at wavelengths $\lambda_4$ and $\lambda_5$ respectively.

5. The device according to claim 4 wherein the first and second light sensitive molecules are covalently bound to the core particles and shell material, respectively.

6. The device according to claim 3 wherein the at least one shell material is an outer shell material which forms the continuous phase in which the colloidal core particles are embedded, including at least one additional shell enveloping each of the colloidal core particles located between the colloidal core particles and the outer shell material, and wherein the at least one additional shell is made of a polymer material.

7. The device according to claim 6 wherein the at least one additional shell enveloping each of the colloidal core particles includes third light sensitive molecules incorporated therein.

8. The device according to claim 7 wherein the first, second and third light sensitive molecules are fluorescent molecules which absorb at wavelengths $\lambda_1$, $\lambda_2$ and $\lambda_3$ respectively, and fluoresce at $\lambda_4$, $\lambda_5$, $\lambda_6$ respectively.

9. The device according to claim 8 wherein the first, second and third light sensitive molecules are covalently bound in the colloidal core particles, in the outer shell material and in the at least one additional shell respectively.

10. The device according to claim 3 wherein the at least one shell material is an outer shell material which forms the continuous phase in which the colloidal core particles are embedded, including a plurality of additional shells located between the colloidal core particles and the outer shell material, and wherein the plurality of additional shells are made of a polymer material.

11. The device according to claim 10 wherein the plurality of additional shells enveloping colloidal core particles includes a first shell adjacent to the colloidal core particles and a second shell adjacent to the first shell, and wherein the first shell adjacent to the colloidal core particles and alternating shells do not contain light sensitive molecules for substantially preventing nonradiative energy transfer and/or crosstalk in interfacial regions between the colloidal core particles and the shells and between adjacent shells.

12. The device according to claim 2 wherein the first and at least second light sensitive molecules are molecules which fluoresce.

13. The device according to claim 12 wherein the molecules which fluoresce are dye molecules which absorb light and fluoresce at different pre-selected wavelengths.

14. The device according to claim 1 wherein the nanostructured material is a two dimensional material in which the colloidal core particles form a periodic two-dimensional array in the at least one shell material.

15. The device according to claim 1 wherein the nanostructured material is a three-dimensional material in which the colloidal core particles form a periodic three-dimensional array in the at least one shell material.

16. The device according to claim 1 wherein the nanostructured material is applied to a document, and wherein information is written into the nanostructured material by altering a property of the one of first light sensitive molecules and the at least second light sensitive molecules, or a combination of both, using light.

17. The device according to claim 4 wherein the nanostructured material is applied to a document, and wherein information is written into the nanostructured material by a step of selectively photobleaching pre-selected regions of the nanostructured material containing the first and at least second light sensitive molecules.

18. The device according to claim 17 wherein the step of selectively photobleaching pre-selected regions of the nanostructured material containing the first and at least second light sensitive molecules includes storing a first type of information by photobleaching the first light sensitive molecules in a pre-selected region of the nanostructured material using a light source which emits light at an effective wavelength to photobleach the first light sensitive molecules but not the at least second light sensitive molecules.

19. The device according to claim 18 wherein the step of selectively photobleaching pre-selected regions of the nanostructured material containing the first and at least second light sensitive molecules further includes storing a second type of information by photobleaching at least one of the at least second light sensitive molecules in the pre-selected region of the nanostructured material using a light source which emits light at an effective wavelength for photobleaching the at least one of the at least second light sensitive molecules but not the first light sensitive molecules and a remaining number of the at least second light sensitive molecules for storing multiple types of information in the same region of the nanostructured material.

20. The device according to claim 4 wherein the nanostructured material is a computer memory storage device, and wherein information is written into the nanostructured material by a step of selectively photobleaching pre-selected regions of the nanostructured material containing the first and at least second light sensitive molecules are molecules which fluoresce.

21. The device according to claim 20 wherein the step of selectively photobleaching pre-selected regions of the nanostructured material containing the first and at least second light sensitive molecules includes storing a first type of information by photobleaching the first light sensitive molecules in a pre-selected region of the nanostructured material using a light source which emits light at an effective wavelength to photobleaching the first light sensitive molecules but not the at least second light sensitive molecules.

22. The device according to claim 21 wherein the step of selectively photobleaching pre-selected regions of the nanostructured material containing the first and at least second light sensitive molecules further includes storing a second type of information by photobleaching at least one of the at least second light sensitive molecules in the pre-selected region of the nanostructured material using a light source which emits light at an effective wavelength for photobleaching the at least one of the at least second light sensitive molecules but not the first light sensitive molecules and a remaining number of the at least second light sensitive molecules for storing multiple types of information in the same region of the nanostructured material.

23. The device according to claim 21 wherein the nanostructured material is a two dimensional material in which the colloidal core particles form a periodic two-dimensional array in the at least one shell material.

24. The device according to claim 21 wherein the nanostructured material is a three-dimensional material in which the colloidal core particles form a periodic three dimensional array in the at least one shell material.

25. The device according to claim 24 wherein the step of selectively photobleaching pre-selected regions of the nanostructured material includes using single-photon or two-photon photobleaching.

26. The device according to claim 25 wherein the single-photon or two-photon photobleaching is done using a confocal microscope for writing in the information at a pre-selected depth in the three dimensional array.

27. The device according to claim 23 wherein the step of selectively photobleaching pre-selected regions of the nanostructured material includes using single-photon or two-photon photobleaching.

28. The device according to claim 3 wherein the at least one shell material is a plurality of shells, wherein each of the plurality of shells includes light sensitive molecules, with the light sensitive molecules in a given shell being light sensitive at a wavelength different from the wavelength of the light sensitive molecules in the rest of the shells.

29. The device according to claim 3 wherein the at least one shell material is a plurality of shells, wherein the plurality of shells is an even number of shells, wherein the shell immediately adjacent to each colloidal core particle is a first shell and the next shell immediately adjacent to the first shell is a second shell, and wherein only alternating shells of the plurality of shells contain light sensitive molecules starting with the second shell, with the light sensitive molecules in a given shell being light sensitive at a wavelength different from the wavelength of the light sensitive molecules in the rest of the alternating shells.

30. The device according to claim 28 wherein the nanostructured material is a two-dimensional material in which the colloidal core particles form a periodic two-dimensional array.

31. The device according to claim 28 wherein the nanostructured material is a three-dimensional material in which the colloidal core particles form a periodic three-dimensional array.

32. The device according to claim 31 wherein the step of selectively photobleaching pre-selected regions of the nanostructured material includes using single-photon or two-photon photobleaching.

33. The device according to claim 32 wherein the single-photon or two-photon photobleaching is done using a confocal microscope for writing in the information at a pre-selected depth in the three dimensional array.

34. The device according to claim 30 wherein the step of selectively photobleaching pre-selected regions of the nanostructured material includes using single-photon or two-photon photobleaching.

35. A method of producing an optical data storage device, comprising the steps of:
incorporating first light sensitive molecules into colloidal core particles;
incorporating second light sensitive molecules into at least one shell forming material;
encapsulating the colloidal core particles in the at least one shell forming material; and
producing a periodic array of the encapsulated colloidal core particles, and processing the periodic array in such a way that the at least one shell forming material forms a continuous phase in which the colloidal core particles are encapsulated.

36. The method according to claim 35 wherein the colloidal core particles are made of a polymeric material having a glass transition temperature $T_{g, CFP}$, and wherein the at least one shell forming material is made of a polymeric material having a glass transition temperature $T_{g, SFP}$, wherein $T_{g, SFP} < T_{g, CFP}$, and wherein the step of processing the periodic three dimensional assembly in such a way that the at least one shell forming material forms a continuous phase includes heating the periodic three dimensional assembly up to the glass transition temperature $T_{g, SFP}$.

37. The method according to claim 36 wherein the first and second light sensitive molecules are molecules which fluoresce with maximum absorption at different wavelengths $\lambda_1$ and $\lambda_2$ respectively, and which fluoresce at different wavelengths at $\lambda_4$ and $\lambda_5$ respectively.

38. The method according to claim 37 wherein the first and second light sensitive molecules are covalently bound in the colloidal core particles and the at least one shell material respectively.

39. The method according to claim 38 wherein the at least one shell forming material is two or more shell forming materials made of polymeric materials each having a glass transition temperature, the two or more shell forming materials enveloping the colloidal core particles form concentric shells, wherein one of the two or more shell forming materials is adjacent to each colloidal core particle and another of the two or more shell forming materials forms an outer shell, and wherein the shell forming material forming the outer shell has a glass transition temperature $T_{g,outer\ SFP}$ lower than the glass transition temperatures of all other shells located between it and the colloidal core particle, and wherein the outer shell has the second light sensitive molecules incorporated therein, and each of the remaining shells have light sensitive molecules incorporated therein which are sensitive at a different wavelength than the light sensitive molecules in the colloidal core particle and all the other shells.

40. The method according to claim 38 wherein the at least one shell forming material is two or more shell forming materials made of polymeric materials each having a glass transition temperature, the two or more shell forming materials enveloping the colloidal core particles to form concentric shells, wherein one of the shells is adjacent to the colloidal core particle and another of the two or more shell forming materials forms an outer shell, and wherein the shell forming material forming the outer shell has a glass transition temperature $T_{g,outer\ SFP}$ lower than the glass transition temperatures of all other shells located between it and the colloidal core particle, and wherein the shell adjacent to the colloidal core particle does not have light sensitive molecules located therein, and wherein light sensitive molecules are located in alternating shells for substantially preventing nonradiative energy transfer and/or crosstalk in interfacial regions between the colloidal core particles and the shells and between adjacent shells.

41. The method according to claim 36 wherein the at least one shell forming material is two shell forming materials to give two shells each containing light sensitive molecules which absorb at different wavelengths, wherein the first light sensitive molecules in the colloidal core particles are molecules with maximum absorption at wavelength $\lambda_1$ and which fluoresce at wavelength $\lambda_4$, wherein the second light sensitive molecules located in one of the two shells absorb at wavelength $\lambda_2$ and fluoresce at wavelength $\lambda_5$, and including third light sensitive molecules located in the third shell with maximum absorption at wavelength $\lambda_3$ and fluoresce at wavelength $\lambda_6$.

42. The method according to claim 41 wherein the first, second and third light sensitive molecules are covalently bound in the colloidal core particles and the two shells respectively.

43. The method according to claim 35 wherein the nanostructured material is a two-dimensional material in which the colloidal core particles form a periodic two-dimensional array in the at least one shell material.

44. The method according to claim 35 wherein the nanostructured material is a three-dimensional material in which the colloidal core particles form a periodic three-dimensional array in the at least one shell material.

45. A method of storing information in an optical data storage device comprised of nanostructured polymer-based material comprised of an array of colloidal core-shell particles with colloidal cores containing one dye and at least one shell around each colloidal core containing at least a second dye, the at least one shell forms a continuous phase in which the colloidal core particles are embedded, the method including the steps of selective photon photobleaching of at least one of the two dyes in a pre-selected region of the array.

46. The method according to claim 45 wherein the selective photon photobleaching is single photon photobleaching of the at least one of the two dyes in the pre-selected region of the array.

47. The method according to claim 45 wherein the selective photon photobleaching is two-photon photobleaching of the at least one of the two dyes in the pre-selected region of the array.

48. The method according to claim 46 wherein the nanostructured material is a two-dimensional material in which the colloidal core particles form a periodic two-dimensional array.

49. The method according to claim 46 wherein the nanostructured material is a three-dimensional material in which the colloidal core particles form a periodic three-dimensional array.

50. The method according to claim 49 wherein the step of selectively photobleaching pre-selected region of the nanostructured material includes using single-photon or two-photon photobleaching.

51. The method according to claim 50 wherein the single-photon or two-photon photobleaching is done using a confocal microscope for writing in the information at a pre-selected depth in the three-dimensional array.

52. The method according to claim 48 wherein the step of selectively photobleaching pre-selected region of the nanostructured material includes using single-photon or two-photon photobleaching.

53. The method according to claim 45 wherein the step of selectively photobleaching pre-selected regions of the nanostructured material containing the first and at least second light sensitive molecules includes storing a first type of information by photobleaching the first light sensitive molecules in a pre-selected region of the nanostructured material using a light source which emits light at an effective wavelength to photobleaching the first light sensitive molecules but not the at least second light sensitive molecules.

54. The method according to claim 53 wherein the step of selectively photobleaching pre-selected regions of the nanostructured material containing the first and at least second light sensitive molecules includes storing at least a second type of information by photobleaching at least one of the at least second light sensitive molecules in the pre-selected region of the nanostructured material using a light source which emits light at an effective wavelength for photobleaching the at least one of the at least second light sensitive molecules but not the first light sensitive molecules and a remaining number of the at least second light sensitive molecules for storing multiple types of information in the same region of the nanostructured material.

* * * * *